(12) United States Patent
Wang et al.

(10) Patent No.: US 9,973,278 B2
(45) Date of Patent: May 15, 2018

(54) STIMULATED BRILLOUIN SCATTERING (SBS) SUPPRESSION IN AN OPTICAL COMMUNICATIONS SYSTEM

(71) Applicant: ARRIS Enterprises LLC, Suwanee, GA (US)

(72) Inventors: Jun Wang, Warrington, PA (US); Venkatesh G. Mutalik, Middletown, CT (US); Marcel F. Schemmann, Maria Hoop (NZ); Shamsuddin H. Chasmawala, Middletown, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 137 days.

(21) Appl. No.: 15/075,512

(22) Filed: Mar. 21, 2016

(65) Prior Publication Data

US 2017/0272170 A1    Sep. 21, 2017

(51) Int. Cl.
*H04B 10/04*    (2006.01)
*H04B 10/516*    (2013.01)
(Continued)

(52) U.S. Cl.
CPC ..... *H04B 10/5161* (2013.01); *H04B 10/2537* (2013.01); *H04B 10/2575* (2013.01); *H04B 10/25751* (2013.01); *H04B 10/58* (2013.01)

(58) Field of Classification Search
CPC ............ H04B 10/5161; H04B 10/2537; H04B 10/2575; H04B 10/25751; H04B 10/58;
(Continued)

(56) References Cited

U.S. PATENT DOCUMENTS 5,373,385 A * 12/1994 Darcie ............... H04B 10/2537
398/147
6,252,693 B1 * 6/2001 Blauvelt ............ H04B 10/2537
398/163
(Continued)

FOREIGN PATENT DOCUMENTS

EP    0792033 A2    8/1997

OTHER PUBLICATIONS

PCT Search Report & Written Opinion, RE: Application No. PCT/US2017/019262, dated May 10, 2017.
(Continued)

*Primary Examiner* — Hibret Woldekidan
(74) *Attorney, Agent, or Firm* — Lori Anne D. Swanson

(57) ABSTRACT

Techniques for transmitting an optical signal through optical fiber with an improved stimulated Brillouin scattering (SBS) suppression and an improved transmitter's signal to noise ratio (SNR) include externally modulating a light beam emitted from a light source with a high frequency signal. The light beam is also modulated externally with an RF information-carrying signal. The high frequency signal is at least twice a highest frequency of the RF signal. The high frequency signal modulating the light source can be split, providing a portion of the split signal to a phase and gain control circuit for adjusting a phase/gain. The output of phase and gain control circuit can be applied to the external modulator to eliminate intensity modulation for SBS suppression improvement. The optical transmitter's SNR is further improved by cancelling a beat between SBS suppression modulation tone and out of band distortion spectrum of information bearing RF signal.

27 Claims, 5 Drawing Sheets

(51) Int. Cl.
*H04B 10/2575* (2013.01)
*H04B 10/58* (2013.01)
*H04B 10/2537* (2013.01)

(58) Field of Classification Search
CPC ............... H04B 10/541; H04B 10/505; H04B 10/50597; H04B 10/548; H04B 10/504; H04B 10/54; H04B 10/588; H04B 10/50; H04B 10/503; H01S 2301/03; H01S 5/0687
USPC ....... 398/115, 182, 185, 186, 188, 193, 194, 398/183, 187, 200
See application file for complete search history.

(56) References Cited

U.S. PATENT DOCUMENTS

| | | | | |
|---|---|---|---|---|
| 6,535,315 | B1* | 3/2003 | Way | H04B 10/2537 398/182 |
| 7,146,110 | B2* | 12/2006 | Frederiksen, Jr. | H04B 10/2537 398/194 |
| 7,174,109 | B2* | 2/2007 | Wan | H04B 10/5161 398/183 |
| 7,349,637 | B1* | 3/2008 | Frederiksen, Jr. | H04B 10/2537 398/193 |
| 7,848,661 | B2* | 12/2010 | Iannelli | H04B 10/505 398/186 |
| 9,479,261 | B2* | 10/2016 | Wu | H04J 14/02 |
| 2004/0105470 | A1* | 6/2004 | Bond | H01S 5/062 372/26 |
| 2011/0013907 | A1* | 1/2011 | Sugihara | G02F 1/0123 398/38 |
| 2011/0150484 | A1* | 6/2011 | Wang | H04B 10/2537 398/115 |
| 2012/0163833 | A1* | 6/2012 | Wang | H04B 10/25751 398/194 |
| 2012/0263472 | A1* | 10/2012 | Wu | H04J 14/02 398/79 |

OTHER PUBLICATIONS

T. Kanesan, et al., "Experimental demonstration of the compensation of nonlinear propagation in a LTE RoF system with a directly modulated laser", 2013 IEEE International Conference on Communications (ICC), IEEE, Jun. 9, 2013, pp. 3884-3888.

* cited by examiner

STIMULATED BRILLOUIN SCATTERING (SBS) SUPPRESSION IN AN OPTICAL COMMUNICATIONS SYSTEM

BACKGROUND

Optical communications systems utilize modulated light, i.e., optical signals, through light channels or fiber optic cables to transmit information between devices. For example, transmission of broadband signal content, such as analog multichannel video, may include the use of narrow line width light sources in conjunction with low loss, single mode optical fibers (SMF). In optical communication systems, a light beam is modulated in accordance with the information to be conveyed and transmitted along the optical fiber to a receiver.

Long distance transmissions in optical fiber, especially for CATV applications, may require high fiber launch power for better performance, such as, to achieve a required/desired signal to noise ratio. However, if the optical power input to a fiber in the optical communication system is too high, a phenomenon known as Stimulated Brillouin Scattering (SBS) may occur. With SBS, a portion of the light input to the fiber is reflected and the power level of the light transmitted through the fiber is reduced below the intended power level, among other deleterious effects. SBS can reduce the quality of the signal output from the fiber in the form of, such as, noise rise and thereby affect the performance of a communication system.

Fiber nonlinearities limit a maximum power that may be launched into an optical fiber. Fiber nonlinearities represent the fundamental limiting mechanisms to the amount of data that can be transmitted on a single optic fiber. For a single wavelength system, stimulated Brillouin scattering (SBS) puts a limit to the maximum launch power in many communication applications before the impact of other fiber nonlinearities become relevant. A common scenario in which SBS occurs is when a narrow line width optical beam is launched into an optical fiber with a power above a threshold power level. If the power within the SBS gain line width is kept below a SBS threshold power level, the SBS should remain adequately suppressed. Unfortunately, the SBS threshold power level is either too low for current applications or too low for evolving optical communications systems that would benefit from higher launch power in to the optical fiber. For instance, for standard single mode fiber (SMF) is typically in a range of only about 6-7 dBm (4-5 mW). Prior attempts to increase the SBS threshold have resulted in increased distortions along the fiber or other system degradations that continue to limit the launch power.

Thus, techniques are desirable for raising the SBS threshold, e.g., above 6-7 dBm (4-5 mW), so that launch power in to an optical fiber can be successfully increased is desirable in many applications.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

It is noted that while the accompanying FIGs. serve to illustrate embodiments of concepts that include the claimed invention, and explain various principles and advantages of those embodiments, the concepts displayed are not necessary to understand the embodiments of the present invention, as the details depicted in the FIGs. would be readily apparent to those of ordinary skill in the art having the benefit of the description herein.

DETAILED DESCRIPTION

Disclosed herein are techniques for suppressing stimulated Brillouin scattering (SBS) in an optical communication system. As described in more detail below, the techniques include suppressing SBS and/or reducing out of band beats using a direct dithering and externally modulated approach. In embodiments, the disclosed techniques spread optical power of the light beam in a wider optical spectral range, thereby suppressing SBS. In embodiments, a symmetry of the optical spectrum is recoverable for improving SBS suppression. As disclosed in more detail below, embodiments are described that not only increase a SBS threshold, but also minimize distortions or system degradations that may occur, thereby successfully increasing an amount of power that may be launched in to an optical fiber.

In an optical communication system, information is transmitted via message signals through a physical medium from a source to a destination. For example, a cable-based system can be used to deliver analog and/or high-definition digital entertainment and telecommunications such as video, voice, and high-speed Internet services from a headend to subscribers over an existing cable television network using optical signals. Such cable television network can take the form of an all-coax, all-fiber, or hybrid fiber/coax (HFC) network. In an HFC optical communication system, for example, an optical transmitter in a headend/hub converts electrical signals (e.g., data, video, and voice signals) to optical signals. The optical signals are transmitted downstream via a fiber to a fiber node that serves a group of end users (i.e., a service group). The fiber node can include an optical receiver that converts the received optical signals to electrical signals that then are transmitted to the service group, for example, via receiving devices such as cable modems (CMs) and/or set top boxes (STBs).

Figure 1:
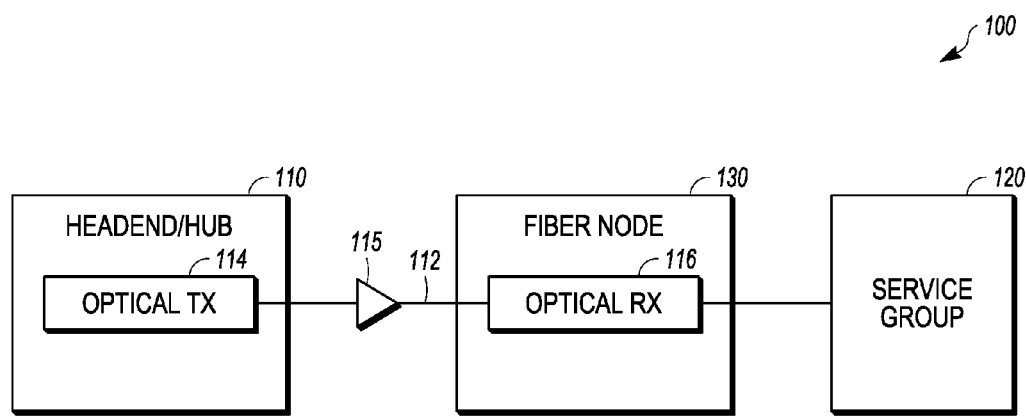
FIG. 1 illustrates an example optical communication system operable to deliver analog and/or high-definition digital entertainment and telecommunications.

FIG. 1 illustrates an example optical communication system 100 operable to deliver analog and/or high-definition digital entertainment and telecommunications such as video, voice, and high-speed Internet services over a fiber 112 between a headend/hub 110 and fiber node 130 for delivery to a service group 120 of receiving devices such as cable modems (CMs) and/or set top boxes (STBs). An optical transmitter 114 in the headend/hub 110 may convert electrical signals representing various services (e.g., video, voice, and Internet) to optical signals for transmission over the fiber 112 to the fiber node 130. The optical signal from the transmitter 114 may be amplified by an optical amplifier 115 (e.g., an erbium doped fiber amplifier (EDFA)) before reaching the fiber node 130. An example EDFA 115 is shown between headend/hub 110 and the fiber node 130, but it is noted that the EDFA 115 may be located in the headend/hub 110 and/or in the fiber node 130 or along the fiber.

A single fiber node 130 is shown in FIG. 1, but it should be understood that a network of nodes may exist between the headend/hub 110 and the service group 120 for delivery of cable services to consumers, and networks may be designed with fiber, coax, or a combination thereof for transmission of optical and/or electrical signals. In the example system shown in FIG. 1, the fiber node 130 includes an optical receiver 116 that converts the received optical signals to electrical signals. The electrical signals then are transmitted to service group 120.

Brillouin scattering is an interaction of light photons with acoustic or vibrational quanta (phonons) that occurs when light in a medium (e.g., air, water, crystal) interacts with time-dependent optical density variations and changes its energy (frequency) and path. The interaction consists of an inelastic scattering process in which a photon is either created (Stokes process) or annihilated (anti-Stokes process). The energy of the scattered light is slightly changed, that is, the energy is decreased for a Stokes process and increased for an anti-Stokes process. The shift in energy, known as the Brillouin shift, is equal to the energy of the interaction.

For intense beams (e.g., laser light) traveling in an optical communications system through a medium, such as optical fiber 112 shown in FIG. 1, the variations in the electric field of the beam itself may produce acoustic vibrations in the medium via electrostriction. The beam may undergo Brillouin scattering from these vibrations, usually in opposite direction to the incoming beam. For example, an incident wave may propagate from the headend 110 to a fiber node 130 along the optical fiber 11, which may have a very small core diameter. When large amounts of light are launched in to the optical fiber 112 by the optical transmitter 114, the incident wave coming from the optical amplifier 115 may exceed a threshold power, exciting an acoustic wave within the fiber 112. A resulting fluctuation in the refractive index from the acoustic wave creates a reflected wave that propagates in a direction opposite to the incident wave. The incident beam undergoes Brillouin scattering from the vibrations, a phenomenon known as stimulated Brillouin scattering (SBS). Brillouin scattering may also reduce the quality of the signal received at the fiber node 130 and thereby degrade the performance of the optical communications system 100.

Stimulated Brillouin scattering is frequently encountered when narrow-band optical signals (e.g., from a single-frequency laser) are amplified in an optical amplifier. It is well known that the amount of light, or the available power, that can be injected into a single-mode fiber is limited by SBS. With SBS, instead of light going in to the fiber, light is reflected back along the input path. The SBS can be thought of as a result of an overflow of light in to the optical fiber. Therefore, it is important to accommodate for the SBS threshold when designing an optical transmission system. For example, in applications such as radio frequency over glass (RFoG) applications, it may desirable to successfully launch more light in to the optical communications system than is achievable by currently available techniques. This is especially true for analog transmission systems for hybrid fiber-coax (HFC) networks and passive optical networks (PON) in which high fiber launch power enables the high signal to noise ratio requirement to be achieved and permits higher split numbers along the transmission line.

It is desirable to mitigate the amount of SBS in an optical fiber, maximize the use of light, and/or identify how much light an optical fiber can manage. In particular, the transmission quality of optical signals having relatively high intensity and narrow line width may be improved by reducing the effects of SBS, allowing an increase in an optical signal power level and an increase in a propagation distance between communication links, and accomplishing this is desirable without generating additional system degradation.

In the example optical communications system shown in FIG. 1, the output of the optical transmitter 114 is shown connected to an optical amplifier 115. An optical amplifier is a device that amplifies an optical signal directly, without the need to first convert the signal to an electrical signal. A doped fiber amplifier (DFAs) is an example optical amplifier that uses a doped optical fiber as a gain medium to amplify an optical signal. In particular, the signal input to be amplified and a pump laser are multiplexed into the doped fiber and the signal is amplified through interaction with the doping ions.

The success of optical amplifiers, such as erbium doped fiber amplifiers (EDFA) and semiconductor optical amplifiers (SOA), has essentially eliminated high transmitter output power or high fiber launch power as a problem in most optical fiber communication applications. This is because these amplifiers permit efficient amplification at saturated output powers. For example, the amplifiers may perform efficient amplification of signals at optical carriers around 1550 nm up to saturated output powers exceeding 23 dBm (200 mW). The use of such an amplifier also enables longer reach fiber links and the ability to optically split the signal to serve multiple users.

However, as described above, despite the use of such optical amplifiers and the abilities to increase launch power in to the fiber, fiber nonlinearities nevertheless limit maximum launch power into optical fiber because of the SBS. In particular, for a single wavelength system, stimulated Brillouin scattering (SBS) puts a limit to maximum launch power in many communication applications before the impact of other fiber nonlinearities becomes relevant. Because SBS occurs when an optical beam with line width is launched into an optical fiber with a power above a threshold power level, SBS should remain adequately suppressed as long as the power within the SBS gain line width does not exceed the SBS threshold power level. Wavelength (the threshold is lower at 1550 nm than 1310 nm) and the linewidth of the transmitter, among other parameters, govern the precise threshold for the onset of the SBS effect. Unfortunately, the SBS threshold power level is still a limiting factor. For instance, for standard SMF the SBS threshold power is typically in a range of only about 6-7 dBm (4-5 mW). Thus, raising the SBS threshold above 6-7 dBm (4-5 mW) so that launch power can be increased is desirable in many applications.

SBS affects optical transmission systems within an optical channel but normally do not cause crosstalk between multiple optical channels because of its narrow gain spectral width. However, because of its narrow bandwidth nature, SBS is particularly detrimental to optical transmission systems having modulation schemes which generate narrow optical spectrum where most of the optical power centers in a small frequency range near the optical carrier. As an example, the modulation schemes of CATV/HFC systems are typically amplitude modulation with vestigial sideband (AMVSB) whose root mean square (RMS) modulation index is about 20%/o to 30% without laser clipping. Therefore, most of the energy centers are within a small bandwidth around the optical carrier. Thus, SBS impacts CATV/HFC systems on carrier to noise ratios (CNR) and distortions, especially second order distortion, CSO.

In CATV/HFC systems, for an externally modulated transmitter one way to broaden the linewidth involves adding an AC modulation signal (dither signal) to the DC current source used drive to source laser. This broadens the spectral linewidth of the transmitter and increases the threshold for the onset of SBS.

SBS affects the externally modulated analog systems much more than directly modulated analog systems if proper SBS suppression mechanism are not implemented. The first reason for this is that an external modulator exhibits almost zero modulator chirp, and thus, the power is densely centered closely around the optical carrier. The second reason is that external modulators are used for longer reach because of their low chirp, and long reach requires more launch power. A system with a directly modulated transmitter is susceptible to fiber dispersion such that distortions are caused when the signal is carried over a non-zero dispersion wavelength of the fiber.

On the other hand, in directly modulated analog systems, a broadened optical spectrum due to a relatively larger laser chirp may be less affected by SBS, thus allowing more optical input power to the fiber. A directly modulated transmitter puts out optical power with such a large linewidth such that it is significantly greater than the SBS gain bandwidth and therefore a directly modulated transmitter is not very susceptible to SBS. Nonetheless, the laser chirp together with fiber dispersion restricts link length due to performance degradation. In view of the foregoing, the directly modulated analog systems are usually used for shorter reach with a relatively lower launch power, and, therefore, the analog transmission systems of directly modulated lasers are typically less susceptible to SBS. However, such directly modulated analog systems may have a very high output power when used with high split ratios (one transmitter serving many nodes), where high power can generate more chirp to widen the line-width using a high power laser (thereby helping SBS suppression) (not true if the high power is achieved by EDFA).

As discussed above, manners for mitigating the effects of SBS include using also phase modulation, increasing the linewidth of the source, and limiting the power per SBS gain linewidth or per peak for discrete components in the transmitter output optical spectrum to less than the SBS threshold. In general, SBS impact can be reduced in an externally modulated analog system if the optical signal's spectrum can be broadened since the energy per bandwidth or per spectral peak is lowered. The most effective and widely used techniques for combating SBS include the use of an optical phase modulator or dithering the laser or the combination of both, in the case of external modulators.

Using phase modulation may add significant cost and optical loss and also may not be practical based on the transport technology used. Increasing the linewidth of the source may result in significant dispersion penalty. Ensuring the power per channel is less than the SBS threshold may not be applicable to long haul networks without a reduction in amplifier spacing, thus adding cost. In an example, a wavelength of light is divided in to two smaller wavelengths, each less than a Brillouin scattering threshold, for inputting to the optical fiber. If two wavelengths each less than a 7 dBm Brillouin threshold are input in to the optical fiber, the SBS limit of that transmitter is effectively increased by 3 db. However, the extension of the SBS limit achieved by such attempts has been limited, whereby current approaches have been unable to extend the limit past higher power, such as 16-18 dbm for nominal links.

Dithering a laser directly is an approach for SBS suppression that may be more cost effective because it does not require an optical phase modulator. Dithering can be done with high frequency or low frequency, the high frequency implementation using a dither frequency that is at least twice the highest signal frequency, the low frequency implementation using a frequency that is lower than the lowest signal frequency. It is noted that dithering by applying a low frequency sine wave either to the resistive heater in the phase control section or to the laser's active section directly. For example, a low frequency may dither a laser thermally either through TEC or bias current.

Dithering based on the high frequency implementation involves applying a high frequency sine wave, whose frequency is at least twice of the highest signal frequency, to the laser's active section directly. If a desired launch power target is attainable using direct dithering, it is a desirable SBS suppression approach. As used herein, the "higher" frequency of the dither signal, relative to a lower frequency, may have a frequency that is at least twice the highest signal frequency (i.e., higher than the frequency of the signal, or the lower frequency signal).

It is noted that in direct dithering approaches, due to the simultaneous intensity modulation (IM) and frequency modulation (FM) or chirp, the spread optical spectrum loses its symmetry as compared to a pure FM spectrum. This leads to an enhanced spectral component on one side of original optical carrier because of the summation of the FM and IM spectral components, and a suppressed spectral components on the other side because of subtraction of the FM and IM spectral components, leading to an asymmetry of the optical spectrum around the optical carrier. As discussed above, for a fixed SBS threshold per spectrum of a fiber, the highest optical spectrum component decides the maximum allowed fiber launch power in the asymmetrical optical spectrum. Thus, it is desirable to eliminate the asymmetry of the spectrum so that the optical spectral component can be set back for a better SBS suppression. It is noted that the highest spectrum component is the peak of optical spectrum point (see FIG. 3, for example), where "set back" means to set it to the spectrum that is produced by FM only. The asymmetrical line is the result of the AM and FM spectrum, where setting back refers to setting the spectrum back to FM without the AM.

In accordance with the above, while the optical power is intensity modulated, the optical field intensity is proportional to the field amplitude squared and is both amplitude modulated and frequency modulated (FM). In other words, due to the simultaneous intensity modulation (IM) and frequency modulation (FM), the optical electromagnetic field put out by the transmitter is amplitude modulated (AM)

and FM modulated, where pure FM modulated is desired to obtain a symmetric spectrum. As shown by equations (1) and (11) below, the relationship between IM, FM, and AM is illustrated. The laser AM and FM happen simultaneously due to the nature of the laser, even if only the AM modulation is targeted.

Further, while directly dithering DFB laser diode can improve the SBS suppression, there may be side effects on the transmission performance. By theory, the frequency of the dither tone should be twice as the highest frequency of the signal band because the beat of the dither tone and signal band due to second order mixing effect can cause side bands that reside around dither tone. If the dither tone is not far away from the signal band (i.e., the twice of the highest signal frequency) the side band spectrum can intrude into the signal band, overlapping signal band. This overlapping plays a roll of adding some noise to the signal band, degrading the carrier to noise ratio.

Theoretically, if the dither tone frequency is set higher than twice the highest signal frequency, the performance of a transmitter is solely decided by the RF, modulator and laser performance, i.e., noise and distortion performance. However, the distortion may also cause out of band beat spectrum in the form of carrier-to-carrier beat or carrier-to-QAM beat. The out of band beats happen on both sides of the signal band. The beats outside the high frequency side of the signal band cause the effective RF spectrum to be wider than the signal band itself. As a result, the SBS dither tone may cause additional or extra noise even if its frequency is set to twice the highest signal frequency. One solution is to move the dither frequency higher. However the laser bandwidth and FM (chirp) efficiency limit how far the dither frequency can be moved. Another solution is to attempt to eliminate the out of band beat without moving the dithering tone too far.

As discussed above, as long as the power within the SBS spectral line width of a transmission media does not exceed SBS threshold power level, SBS may remain adequately suppressed. However, described by way of example, a typical SBS threshold for standard SMF is generally within a range of about 6-7 dBm (4-5 mW). Raising the relative SBS threshold above 6-7 dBm so that launch power into optical fiber can be increased is desired, particularly with respect to CATV/HFC systems. Referring to the example optical communication system 100 of FIG. 1, disclosed herein are modifications to a conventional optical transmitter 114 for providing more efficient uses of the optical fiber.

Disclosed herein are techniques for optimizing SBS suppression and reducing out of band beats. The method allows improved SBS suppression using the direct dithering method. As described in more detail below, embodiments are disclosed in which a light beam emitted from a light source may be modulated with one or multiple high frequency dithering signal(s). After being emitted by the light source, which may be dithered by dithering signal(s), the light beam may be further intensity modulated externally with an RF information-carrying signal. In embodiments, the high frequency dithering signal is at least twice a highest frequency of the RF information-carrying signal. The light beam which is intensity-modulated with the RF information-carrying signal may be thereafter coupled into optical fiber. In embodiments, the high frequency dithering signal spreads the optical power of the light beam in a wider optical spectral range, thereby suppressing SBS. The dithering high frequency signal, before sent to the laser, may itself be dithered by a low frequency signal. Thus, the signal that dithers the laser is a high frequency signal but that laser dithering signal can be dithered by another low frequency dithering signal. So the laser dithering signal is a dithered high frequency signal.

There can be a high frequency dither signal and a low frequency dither signal. In embodiments, the high frequency dither signal (at least two times the highest signal frequency) is applied both to the source laser and the external modulator. Dithering the source laser causes an intensity modulation. Providing the dither to the modulator as well undoes (i.e., cancels or reverses) that IM modulation (resulting from dithering the source laser) by providing the dither to the modulator in such a way that it cancels the IM from the source laser. Thus, in embodiments, the goal is to be left with the FM (the source laser causes FM when dithered) only. An FM modulated spectrum is symmetric by nature.

As described herein, SBS suppression includes introduction of a tone, which may improve an SBS threshold value. However, the tone itself introduces out of band (OOB) distortion, which may have frequencies that overlap the signal band. Disclosed are techniques for not only improving SBS suppression, but reducing the distortion that results from SBS suppression techniques. Thus, both an SBS threshold may be increased and noise in the band may be reduced.

Figure 4:
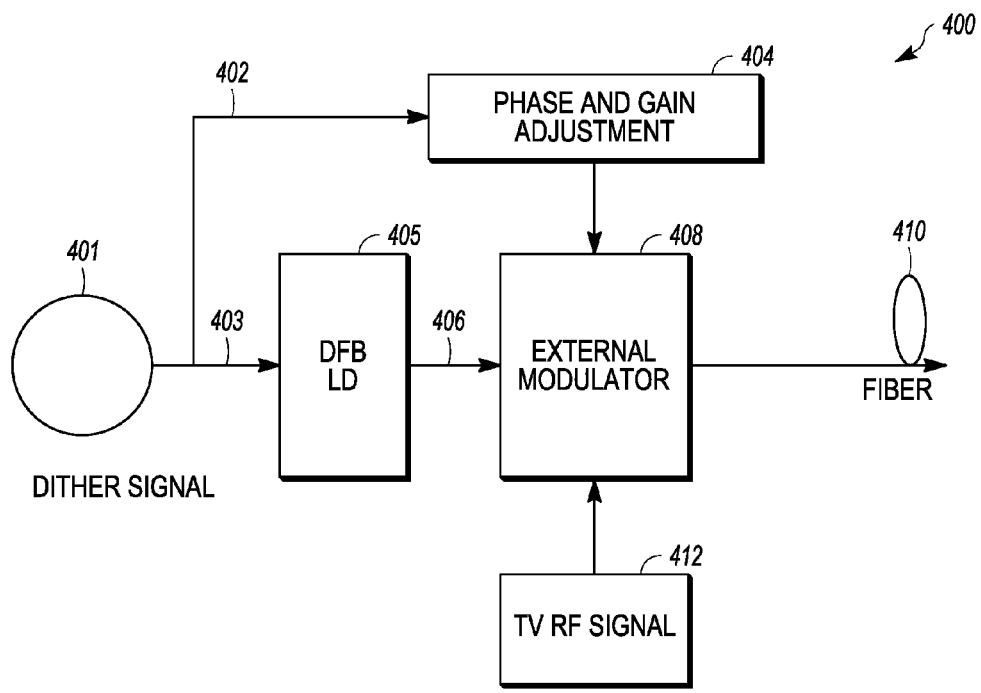
FIG. 4 is a block diagram of a modulator portion of an optical transmitter having a DFB laser and an external modulator, in which SBS suppression dither and dither signal generation circuit as shown in FIG. 1 plus the IM signal cancellation circuit are included.

In embodiments, the high frequency signal modulating the light source is split. As shown in FIG. 4, the signal generator 401 generates a dither signal, which is split as split signals 402 and 403. The split signals 402 and 403 are respectively amplified or attenuated and delayed with respect to each other to achieve a cancellation of the unwanted IM. A portion of the split signal may be sent to a phase and gain control circuit. Further optimizing the spread spectrum for SBS suppression, the output of phase and gain control circuit may be applied to the external modulator to eliminate the intensity modulation. In embodiments, cancelling the beat between the SBS suppression modulation tone and out of band distortion spectrum of an information bearing RF signal further improves the optical transmitter's signal to noise ratio. As will be described in more detail below, the disclosed techniques for transmitting an optical signal through optical fiber may result in both an improved stimulated Brillouin scattering (SBS) suppression and an improved transmitters signal to noise ratio.

In embodiments, optimizing the SBS suppression and reducing the out of band beats is accomplished by introducing a feed to the external modulator with the laser dither tone(s) in such a way that either the IM modulation due to the dithering at the light source can be cancelled or the out of band beat spectrum can be cancelled (or both are cancelled). The dither signal going to the external modulator may be both phase and amplitude controlled to achieve a cancellation of the IM modulation or the out of band beat spectrum that improves SBS suppression. With a significant reduction of the IM modulation, the symmetry of the optical spectrum is recoverable, thereby improving SBS suppression or reducing a beat spectrum due to the signal spectrum, while also reducing the out of band distortion beat spectrum and dither tone. In other words, recovering a symmetrical version of the optical spectrum may include removing or reducing the highest peaks. For example, the highest frequency component caused by summation of the AM and FM modulation may be reduced due to the removal of the AM modulation. The symmetry may result in a low peak on the other side of center carrier being set to the level where the highest peak is reduced to. As shown herein, adding another input to the external modulator may accomplish these goals.

Figure 2:
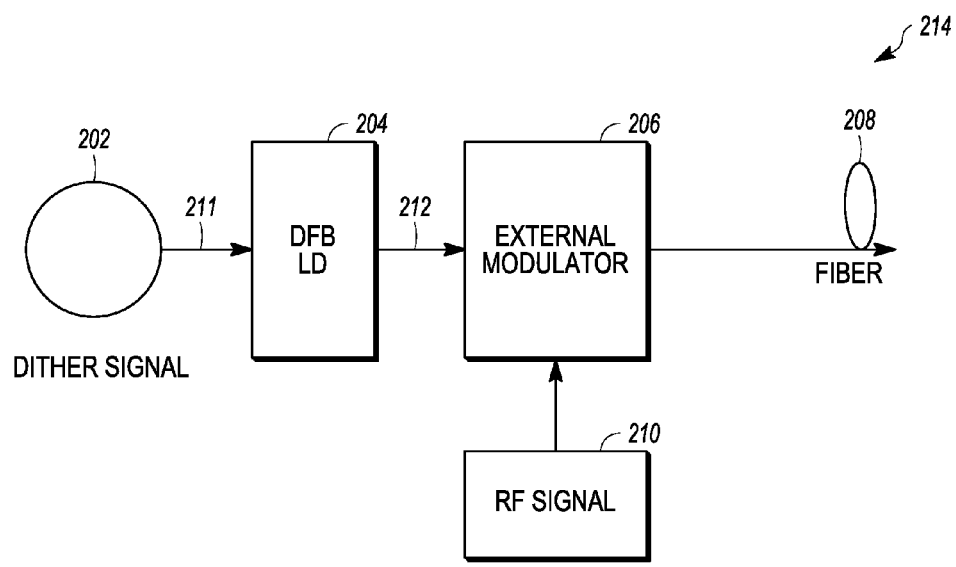
FIG. 2 is a block diagram of a modulator portion of an optical transmitter having a DFB laser and an external modulator, in which SBS suppression dither and dither signal generation circuit are included.

FIG. 2 illustrates an optical fiber transmission system having an embodiment of an optical transmitter 214 with an external modulator 202 for providing suppressed stimulated Brillouin scattering (SBS). The optical transmitter 214 in FIG. 2 includes a light source 204, such as a laser diode, for emitting a light beam 212, a signal generator 202 for dithering the laser 204, and an intensity modulator 206 externally coupled to the light source 204. The intensity modulator 206 receives the light beam 212 and modulates the light beam 212 with an RF information-carrying signal 210, e.g., a cable television RF signal. The signal generator 202 is connected to the light source 204 for driving the light source 204 with a high frequency dithering signal 211. The external modulator 206 may be any suitable modulator for externally modulating the light beam, such as Mach Zenhder (MZ) modulator, electro-absorption (EA) modulator, or the like.

In optical communications, intensity modulation (IM) is a form of modulation in which the optical power output of a source is varied in accordance with some characteristic of the modulating signal. The envelope of the intensity modulated optical signal is an analog of the modulating signal in the sense that the instantaneous power of the envelope is an analog of the characteristic of interest in the modulating signal. The instantaneous power deviation of the IM modulated signal is, to a first approximation, proportional to the momentary amplitude of a modulating signal, where deviation means the deviation from a mean power.

For comparison, it is noted that with analog modulation, the modulator produces optic power variations that resemble an input voltage waveform, the simplest type of analog modulation including transmission of a single sinusoidal current variation, i.e., an optic baseband transmission in which the signal is carried on a light beam modulated at baseband frequencies of information. Frequency modulation refers to the encoding of information in a carrier wave by varying the instantaneous frequency of the wave. By comparison, in amplitude modulation the amplitude of the carrier wave varies while the frequency remains constant.

Figure 3:
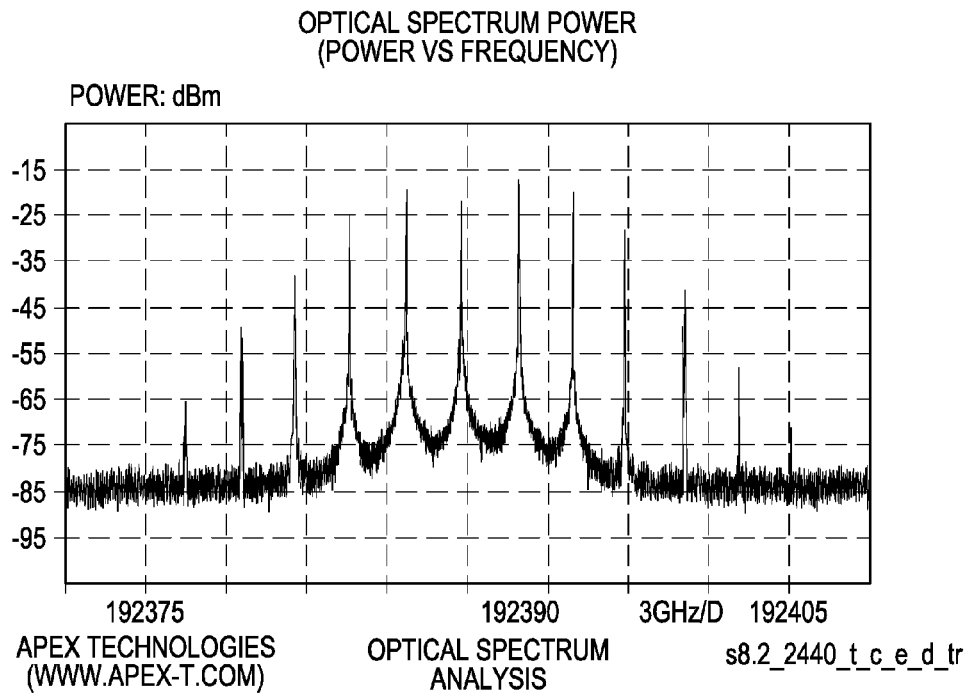
FIG. 3 is an example of the optical spectrum before dither IM is cancelled where the spectral asymmetry is clearly seen.

FIG. 3 depicts a plot of power (dBm) vs. frequency (GHz) for an optical spectrum that may result from directly dithering the laser diode, e.g., by applying a dither signal(s) to the DFB laser 204. As shown in FIG. 3, directly dithering the laser diode 204 may cause an optical spectrum spread. As also shown by the plot in FIG. 3, the spectrum lacks symmetry due to simultaneous intensity modulation (IM) and frequency modulation (FM). Referring back to FIG. 3, the highest enhanced spectral component decides whether the power exceeds the SBS threshold. It is noted that the peak power in the optical spectrum as shown in FIG. 3. If the peak power exceeds the SBS threshold, SBS occurs.

The mathematics of the asymmetrical optical spectrum of an intensity modulated laser diode may be described by its amplitude of the electrical field as follows:

$$E = [P_0(1+m_d \cos(\omega_d t))]^{0.5} \exp[j\omega_0 t + m_{fm} \sin(\omega_d t)] \quad (1)$$

Where:
$P_0$ is the power of the laser output light;
$m_d$ is the optical modulation index of the dithering signal;
$\omega_d$ is the frequency of the dithering signal;
$\omega_0$ is the frequency of optical carrier; and
$m_{fm}$ is the frequency modulation index due to the laser chirp.

Equation (1) demonstrates that optical frequency is decided by two parts, the first part is caused by intensity modulation and is described by:

$$[P_0(1+m_d \cos(\omega_d t))]^{0.5} \quad (2)$$

The normalized Fourier series expansion of equation (2) is:

$$[(1+m_d \cos(\omega_d t))]^{0.5} = A_0 + \sum_{n=1}^{\infty} A_n \cos(n\omega_d t) \quad (3)$$

Where:

$$A_0 = \frac{1}{T} \int_0^T [(1+m_d \cos(\omega_d t))]^{0.5} dt \quad (4)$$

$$A_n = \frac{1}{T} \int_0^T [(1+m_d \cos(\omega_d t))]^{0.5} \cos(n\omega w_d t) dt \quad (5)$$

The FM modulation portion of the spectrum can be expressed as $$\exp[j\omega_0 t + m_{fm} \sin(w_d t)] \quad (6)$$

The Fourier series expansion of equation (6) is:

$$\exp[j\omega_0 t + m_{fm} \sin(\omega_d t)] = J_0(m_{fm})\exp(j\omega_0 t) + \sum_{m=1}^{\infty} J_n(m_{fm})[\exp(j(\omega_0 + n\omega_d)t) + (-1)^n \exp(j(\omega_0 - n\omega_d)t)] \quad (7)$$

Where $J_n$ is the Bessel function of the first kind at $n^{th}$ order.

The optical spectrum is thus decided by the product of equations (3) and (7) as:

$$E = P_0^{0.5} \left[ B_0 \exp(j\omega_0 t) + \sum_{n=1}^{\infty} B_{nH} \exp(j(\omega_0 + n\omega_d)t) + \sum_{n=1}^{\infty} B_{nL} \exp(j(\omega_0 - n\omega_d)t) \right] \quad (8)$$

Where:

$$B_0 = \sum_{k=0}^{\infty} A_{2k} J_{2k} \quad (9)$$

$B_{nH}$ represents the amplitude of upper sideband optical spectral components, calculated as:

$$B_{nH} = 0.5(A_0 J_n + A_n J_0) + 0.5 \sum_{k=1}^{\infty} J_k(A_{|n-k|} + (-1)^n A_{n+k}) \quad (10)$$

$B_{mL}$ represents the amplitude of lower sideband optical spectral components, calculated as:

$$B_{nL} = 0.5((-1)^n A_0 J_n + A_n J_0) + 0.5 \sum_{k=1}^{\infty} J_k(A_{n+k} + (-1)^n A_{|n-k|}) \quad (11)$$

FIG. 4 depicts an embodiment for an optical transmitter 400 configured for optimizing SBS suppression using the disclosed techniques. Compared to the modulator 206 shown in the optical transmitter 214 in FIG. 2, the dither signal from the signal generator 401 is split into two portions, 402 and 403. The dither signal portion 403 is transmitted to the laser 405 for direct dithering modulation and the other dither signal portion 402 is provided to a phase and gain adjustment circuit 404 for a phase and gain adjustment before transmission to the modulator 408.

Figure 5:
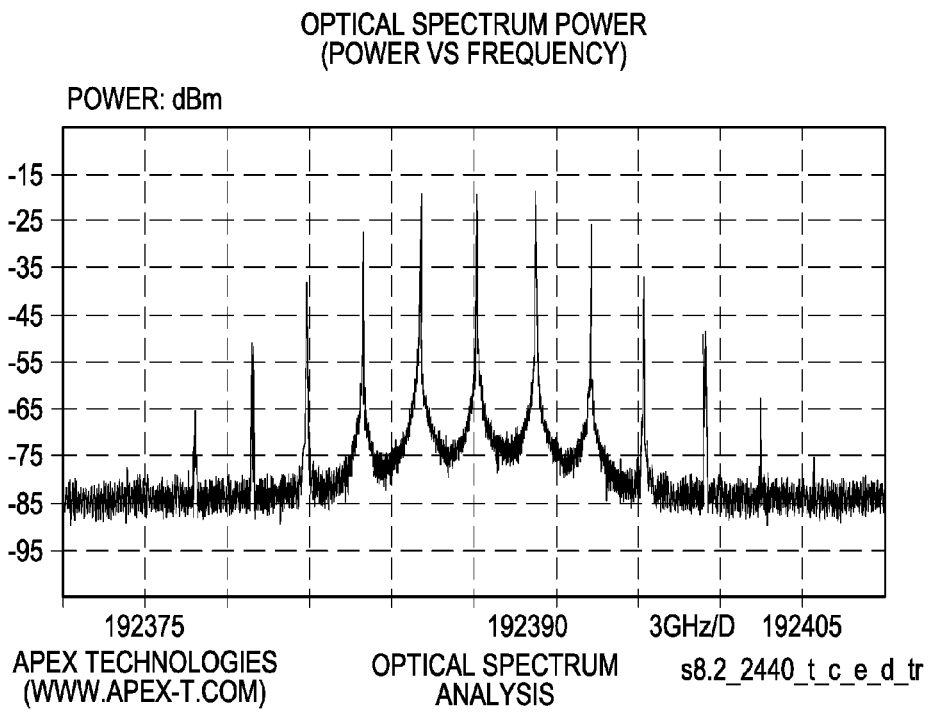
FIG. 5 is an example of the optical spectrum after dither IM is cancelled from the spectrum in the FIG. 4. The symmetrical spectrum is achieved.

The modulator 408 may be any suitable modulator for modulating a light beam, such as an MZ modulator or an EA modulator, for example. The gain and phase adjustment circuit 404 may be configured such that the dither signal portion 402 output to the modulator 408 provides an intensity modulation that cancels the intensity modulation from the direct laser dithering. In turn, the promoted (summation of AM/FM modulation) optical spectral components due to FM and IM simultaneous modulation are set back to a non-promoted and symmetrical spectrum (FM spectrum only), as shown in FIG. 5. In other words, the non-symmetrical optical spectral components produced due to simultaneous FM and IM modulation are brought back to symmetrical spectral components due to FM modulation only. As a result of the configuration in FIG. 4, the SBS suppression is increased and optimized.

As shown in FIG. 4, by tapping off a portion of a dither signal and feeding it in to an external modulator, the optical spectrum may be reshaped for symmetry (shown in FIG. 5). By removing the highest peaks, the SBS threshold is thereby improved. Because dither causes both FM and AM modulation, the tap-off circuit may remove or cancel the AM modulation from the external modulator, leaving FM modulation (inherently symmetrical).

The mathematical explanation of this intensity modulation elimination may be expressed as:

$$E=[P_0(1+m_d \cos(\omega_d t))]^{0.5} \exp[j\omega_0 t+m_{fm} \sin(w_d t)](1-em_d \cos(w_d t))^{0.5} \quad (12)$$

Where $em_d$ is the optical modulation index of the dither signal at the external modulator whose phase and gain are set by phase and gain controlling circuit 404. Phase is adjusted to be out of phase with the original dither signal, e.g., 180 degree out of phase of the original dither signal.

Equation (12) can be further expressed as $$E = [P_0(1 + (m_d - em_d)\cos(\omega_d t) - m_d em_d \cos^2(\omega_d t))]^{0.5} \quad (13)$$

$$\exp[j\omega_0 t + m_{fm}\sin(\omega_d t)] =$$

$$[P_0(1 - 0.5 m_d em_d + (m_d - em_d)\cos(\omega_d t) -$$

$$0.5 m_d em_d \cos(2\omega_d t))]^{0.5} \exp[j\omega_0 t + m_{fm}\sin(\omega_d t)]$$

It is seen that the amplitude of the intensity modulation is reduced to ($m_d$–$em_d$) from $m_d$. As a special case, when ($m_d$=$em_d$). equation (13) becomes $$E = [P_0(1 - 0.5 m_d^2 - 0.5 m_d^2 \cos(2\omega_d t))]^{0.5} \exp[j\omega_0 t + m_{fm}\sin(\omega_d t)] = \quad (14)$$

$$[P_0(1 - m_d^2 \cos^2(\omega_d t))]^{0.5} \exp[j\omega_0 t + m_{fm}\sin(\omega_d t)]$$

The term with $\cos^2(w_d t)$ may be ignored when both $m_d$ and $em_d$ are reasonably smaller than unity and the resulted frequency $2\omega_d$ is far out of the band. The intensity modulation is therefore eliminated or may be ignored. If you want a lesser SBS, suppression. Even if $m_d$ and $em_d$ are not reasonably small, the frequency of 2 W will still make them ignorable.

FIG. 5 illustrates a resulting optical spectrum after the intensity modulation is eliminated by the optical system depicted in FIG. 4, by way of example. FIG. 5 demonstrates that the optical spectrum may be symmetrical, and the promoted spectral components may be set back or returned to a lower value as expected by FM only. The SBS suppression is thus improved. In a comparison of the example spectrums shown by FIG. 3 and FIG. 5, the SBS threshold is improved in the example spectrum shown FIG. 5 by 1 dB. The improvement may be less or more depending on type of laser or modulation index selected. It is noted that the both FIG. 3 and FIG. 5 were achieved from a real transmitter experiment conducted by the inventors.

It is noted that FIG. 5 depicts a scenario in video transmission including both analog and QAM transmissions and a dither tone, the latter intended for improving an SBS threshold. However, as described above, if there is some sort of distortion (see also FIG. 6 below), an undesirable out of band beat, i.e., distortion, results.

Transmitter Signal to Noise Ratio Performance Improvement

Figure 6A:
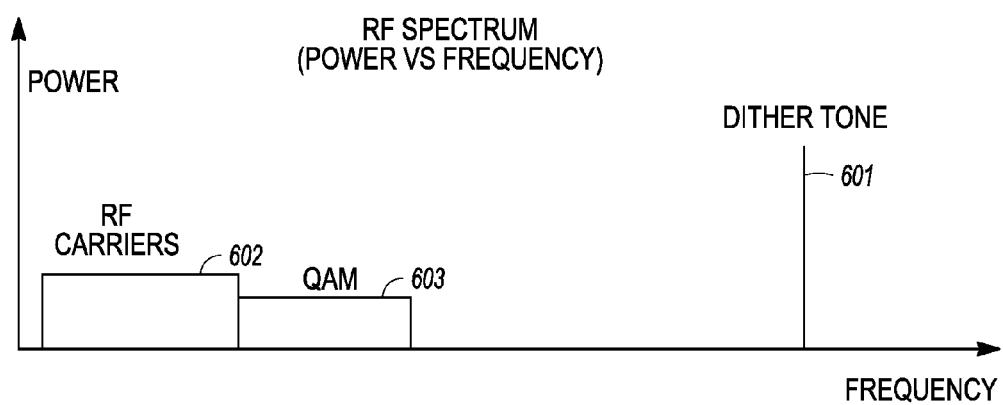
FIG. 6A is an example of the RF spectrum of an ideal transmitter with the signals and a dither tone.

FIG. 6A shows an ideal, i.e., without distortion, RF spectrum of a transmitter that includes both RF signals 602, QAM 603, and a dither signal 601, when there is no transmitter distortion. The RF spectrum and dither signal are independent of each other which can be expressed as $$Y(f)=1+X_1(f)+X_2(f) \quad (15)$$

Where Y(f) is the output signal; $X_1(f)$ and $X_2(f)$ are the RF signal and dither signal respectively with modulation index (via QAM signal 603) included.

When there is beat between signal and dither tone, the spectrum may be expressed, ignoring the higher order terms, as:

$$Y(f)=1+X_1(f)+X_2(f)+aX_1(f)X_2(f) \quad (16)$$

Figure 6B:
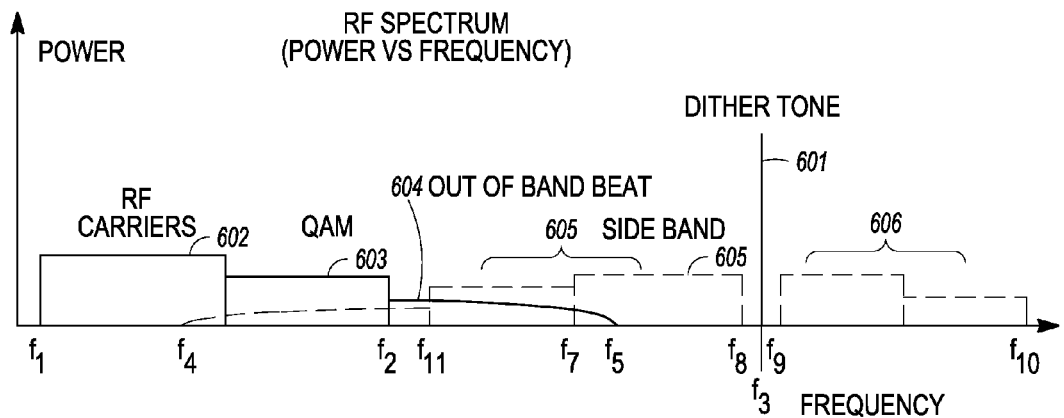
FIG. 6B An example of the RF spectrum of a non-ideal transmitter with the signals and a dither tone.

The beat term produces the beat spectrum around the dither tone as shown in FIG. 6B. FIG. 6B illustrates an example of the actual RF spectrum of a transmitter with the signals and a dither tone, where there is distortion.

In the real system of an externally modulated transmitter, the beat term 604 can be created in many ways. One of the ways can be expressed as followings assuming the dithered light source can be expressed as(1+$m_d$ cos(2π$f_d$t)) The light is then modulated as $$Y(f) = [1 + m_d\cos(2\pi f_d t)][1 + (m_{RF}\cos(2\pi f_{RF} t) - em_d\cos(2\pi f_d t))] = \quad (17)$$

$$1 + m_{RF}\cos(2\pi f_d t) + (m_d - em_d)\cos(2\pi f_d t) +$$

$$m_d m_{RF} \cos(2\pi f_d t)\cos(2\pi f_{RF} t) - m_d em_d \cos^2(2\pi f_d t) =$$

$$1 + m_{RF}\cos(2\pi f_d t) + (m_d - em_d)\cos(2\pi f_d t) +$$

$$0.5 m_d m_{RF}[\cos(2\pi(f_d + f_{RF})t) + \cos(2\pi(f_d - f_{RF})t)] -$$

$$m_d m_{em} \cos^2(2\pi f_d t)$$

It is demonstrated in equation (17) that there is a beat term $m_d m_{RF}$ cos(2π$f_d$t)cos(2π$f_{RF}$t) which generates the two side band signals 605, 606 around dither tone 601, and is as expressed as cos(2π($f_d$+$f_{RF}$)t)+cos(2π($f_d$–$f_{RF}$)t). The two side band signal 605, 606 terms (the broken spectrum ignoring the out of band beats spectrum) are sketched in FIG. 6B. It is seen that the RF signals (RF carriers 602 and QAM 603) are mirrored around the dither tone 601 due to the beat of the RF signal 602 and the dither tone 601. In the absence of the distortion out of band beats 604, if the dither tone frequency is higher than twice the highest RF signal frequency, there is no overlap between the dither caused by the side band spectrum (signals 605 and 606) and the RF signal spectrum (602, 603). It is noted that the derivation is the same as equation (17) where the incoming light is modulated on the left side of first product and the right side is the modulation from the modulator.

However, in the presence of the out of band distortion beat spectrum 604, the distortion beat spectrum (f11–f4) can further get into frequency range far above the RF signal frequency band (f1–f2) (the signal band should also include QAM band). Therefore if the dither frequency f3 cannot be higher than the twice the highest frequency defined by the out of band distortion beat spectrum (2×f5), the side band frequency spectrum (f7–f8 and f9–f10) can overlap the signal spectrum (shown by the overlap in band f2–f4), causing additional noise. If the RF signal 602+603 is distorted by second and third or even higher order distortion, the out of band distortion spectrum (f5–f2) can well get into the spectral range much higher than twice of the highest signal frequency, i.e., higher than 2×f2. Further pushing the dither tone frequency to an even higher frequency becomes impractical.

As described above, FIG. 4 shows the proposed idea of reducing the overlapping between side band spectrum due to out of band distortion beat spectrum and signal spectrum. Mathematically this idea can be illustrated as followings, whereby by way of example only modulator distortion is considered:

$$Y(f)=[1+m_d \cos(2\pi f_d t)][1+(m_{RF} \cos(2\pi f_{RF}t)-em_d \cos(2\pi f_d t))+b[m_{RF} \cos(2\pi f_{RF}t)-em_d \cos(2\pi f_d t)]^2+c[m_{RF} \cos(2\pi f_{RF}t)-em_d \cos(2\pi f_d t)]^3+d[m_{RF} \cos(2\pi f_{RF}t)-em_d \cos(2\pi f_d t)]^4]=1+m_{RF} \cos(2\pi f_{RF}t)+(m_d-em_d)\cos(2\pi f_d t)+(m_d m_{RF}-2b*m_{RF}em_d)\cos(2\pi f_d t)\cos(2\pi f_{RF}t)-m_d em_d \cos^2(2\pi f_d t)+b*m_{RF}^2 \cos^2(2\pi f_{RF}t)+b*em_d^2 \cos^2(2\pi f_d t)+b*m_{RF}^2 m_d \cos(2\pi f_{RF}t)\cos(2\pi f_{RF}t)+b*em_d^2 m_d \cos^2(2\pi f_d t)-2b*m_{RF}em_d m_d \cos^2(2\pi f_d t)\cos(2\pi f_{RF}t)+cm_{RF}^3 \cos^3(2\pi f_d t)-3c*m_{RF}^2 em_d \cos^2(2\pi f_{RF}t)\cos(2\pi f_d t)+3c*m_{RF}em_d^2 \cos(2\pi f_{RF}t)\cos^2(2\pi f_d t)-c*em_d^3 \cos^3(2\pi f_d t)+cm_{RF}^3 m_d \cos^3(2\pi f_{RF}t)\cos(2\pi f_d t)-3c*m_{RF}^2 m_d em_d \cos(2\pi f_{RF}t)\cos^2(2\pi f_d t)+3c*m_{RF}m_d em_d^2 \cos(2\pi f_{RF}t)\cos^3(2\pi f_d t)-c*m_d em_d^3 \cos^2(2\pi f_{RF}t)+dm_{RF}^4 \cos^4(2\pi f_{RF}t)-4d*m_{RF}^3 em_d \cos^3(2\pi f_{RF}t)\cos(2\pi f_d t)+6d*m_{RF}^2 em_d^2 \cos^2(2\pi f_{RF}t)\cos(2\pi f_d t)-4dm_{RF}em_d^3 \cos(2\pi f_{RF}t)\cos^3(2\pi f_d t)+dm_{RF}^4 \cos^4(2\pi f_{RF}t)+dm_{RF}^4 em_d \cos^4(2\pi f_{RF}t)\cos(2\pi f_d t)-4d*m_{RF}^3 em_d \cos^3(2\pi f_{RF}t)\cos^2(2\pi f_d t)+6d*m_{RF}^2 m_d em_d^2 \cos^2(2\pi f_{RF}t)\cos^3(2\pi f_d t)-4dm_{RF}m_d em_d^3 \cos(2\pi f_{RF}t)\cos^4(2\pi f_d t)+dm_d m_{RF}^4 \cos^5(2\pi f_{RF}t)]$$ (18)

Where b, c and d are respectively the coefficient of the second, third and fourth order distortion caused by the nonlinear distortion of the modulator.

In equation (18), the terms involving $\cos^n(2\pi f_d t)$ where $n \geq 2$ may be dropped in this discussion because resulting terms are out of the band of interest. This leads to the following $$Y(f) \approx 1+m_{RF} \cos(2\pi f_{RF}t)+(m_d-em_d)\cos(2\pi f_d t)+(m_d m_{RF}-2b*m_{RF}em_d)\cos(2\pi f_d t)\cos(2\pi f_{RF}t)+b*m_{RF}^2 \cos^2(2\pi f_{RF}t)+cm_{RF}^3 \cos^3(2\pi f_{RF}t)+dm_{RF}^4 \cos^4(2\pi f_{RF}t)+(b*m_{RF}^2 m_d-3c*m_{RF}^2 em_d)\cos^2(2\pi f_{RF}t)\cos(2\pi f_d t)+(cm_{RF}^3 m_d-4d*m_{RF}^3 em_d)\cos^3(2\pi f_{RF}t)\cos(2\pi f_d t)+dm_{RF}^4 m_d \cos^4(2\pi f_{RF}t)\cos(2\pi f_d t))$$ (19)

In equation (19), the first line represents the mean power around which the transmitter output power is modulated, fundamental, dither tone, and beat between signal and dither tone. If the dither tone frequency is two times larger than the highest signal frequency, the resulting side bands will not get into the signal band, as described above. The second line in equation (19) represents the second, third and fourth order distortions. The third, fourth and fifth line represent the beat terms between the dither tone and second order, third order, and fourth order distortion spectral terms, respectively. These terms can cause intrusion of the noise into the signal band even though the dither signal frequency is set two time higher than the highest signal frequency, thereby degrading the transmission system performance as stated earlier.

To reduce the intrusions, the following relationships may be satisfied:

$$b*m_{RF}^2 m_d - 3c*m_{RF}^2 em_d = 0 \text{ or } em_d = b*m/(3c)$$ (20)

for the beat between the second order distortion term and dither tone.

$$cm_{RF}^3 m_d - 4d*m_{RF}^3 em_d = 0 \text{ or } em_d = c*m_d/(4*d)$$ (21)

for the beat between the third order distortion term and dither tone.

If the modulator 408 is biased at its quadrature point plus an optional second order predistorton circuit, the resulted second order distortion can be very small. Therefore, the second order distortion coefficient, b, in equation (20) can be very small while the third order coefficient, c, in the equation (20) may be maintained, i.e., may remain unchanged, by the modulator. It is well known that the third order (and higher order) of the modulator can be a detriment to the performance of the modulator. Thus, the third order pre-distortion circuit may be placed in the RF path that cancels such signal third order distortion significantly, thereby causing a significantly smaller composite third order distortion coefficient, c, in equation (21), than that of the modulator only. However, the fourth order distortion coefficient, d, in equation (21) is maintained, i.e., remains unchanged, as defined by the modulator.

As indicated above, the level of the injected dither tone for noise performance improvement is determined by the dominant beat noise of distortion spectrum and dither tone. A compromise may be to cancel both the second order distortion-dither tone noise and the third order distortion-dither tone noise.

It is also seen from the last term of the first line in equation (19) that to eliminate the beat due to RF signal and dither tone, in embodiments the following condition is met:

$$m_d m_{RF} - 2b*m_{RF}em_d = 0 \text{ or } em_d = 0.5 m_d/b$$ (22)

Finally, in embodiments, the level of the cancellation dither tone injected to the modulator in equation (20)-(22) are proportional to the modulation index of SBS suppression dither signal. In such embodiments, the higher the SBS suppression the higher the injected cancellation level at the modulator.

Conventionally, it has been unlikely or impossible to meet the conditions of cancelling simultaneously both IM modulation for the optimized SBS suppression and the reduced noise due to the beat between dither tone and out of band distortion beat spectrum. However, using the disclosed techniques, it possible to achieve the both conditions simultaneously. For example, in embodiments, first the cancellation condition for the optimized SBS suppression can be targeted, then the pre-distortion circuits may be adjusted to define coefficients of b and c so that equations (20)-(22) are all satisfied. In embodiments, both the RF signal and the cancellation signal (after amplitude and phase adjustment circuit) are fed to the pre-distortion circuit (between the RF signal and modulator 408) before the combined signals are injected into the modulator so that only SBS suppression needs to be optimized.

The equations (18)-(22) describe one of the possible scenarios of how the cancellation works and is meant for illustration; however it should be understood that the application of the idea is not limited to this example. For example, even if the IM modulation due to the dither tone is totally cancelled, IM can still be regenerated at the receiver because of the FM demodulation by fiber dispersion. The noise performance improvement at the receiver can be slightly different. However, the cancellation of the IM modulation can still reduce the noise due to the beat between the dither tone and the out of band distortion spectrum on the receiver side.

In one or more examples, the functions described herein may be implemented in hardware, software, firmware, or any combination thereof, for automated adjustments. The subject matter of this disclosure, and components thereof, can be realized by instructions, also referred to herein as a computer program, that upon execution cause one or more processing devices to carry out the processes and functions described above. If implemented in software, the functions may be stored on or transmitted over as one or more instructions or code on a computer-readable medium and executed by a hardware-based processing unit. Such instructions can, for example, comprise interpreted instructions, such as script instructions, e.g., JavaScript or ECMAScript instructions, or executable code, or other instructions stored in a computer readable medium.

Figure 7:
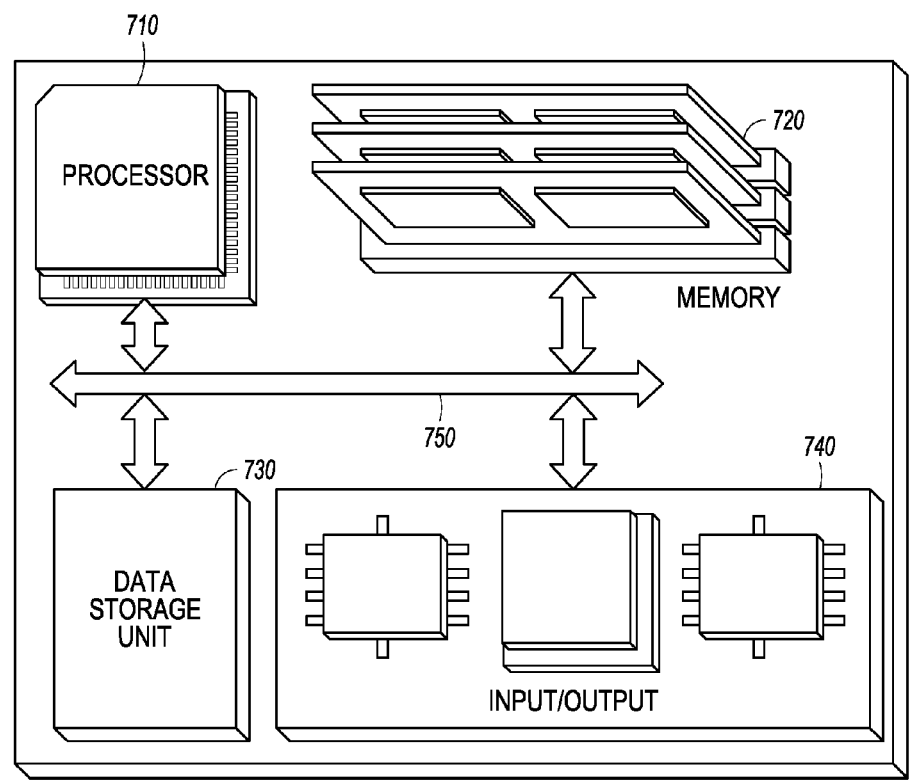
FIG. 7 is a block diagram of a hardware configuration operable to perform the functions disclosed herein.

FIG. 7 is a block diagram of a hardware configuration 700 operable to perform the functions disclosed herein. The hardware configuration may define a data source or computing device, such as a general hardware platform server configured to receive and transmit information over a network.

The hardware configuration 700 can include a processor 710, a memory 720, a storage device 730, and an input/output device 740. Each of the components 710, 720, 730, and 740 can, for example, be interconnected using a system bus 750.

The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730. In embodiments where the processor 710 includes two or more processors, the processors may operate in a parallel or distributed manner. The processor 710 may execute an operating system of memory 720 or software associated with other elements of memory 720.

The memory 720 can store information within the hardware configuration 700. In embodiments, the memory 720 can be a computer-readable medium. In embodiments, the memory 720 can be a volatile memory unit. In embodiments, the memory 720 can be a non-volatile memory unit. In embodiments, the storage device 730 can be capable of providing mass storage for the hardware configuration 700. In embodiments, the storage device 730 can be a computer-readable medium. In various embodiments, the storage device 730 can, for example, include a hard disk device, an optical disk device, flash memory or some other large capacity storage device. In other embodiments, the storage device 730 can be a device external to the hardware configuration 700.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, and DSL are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The input/output device 740 provides input/output operations for the hardware configuration 700. In embodiments, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for providing video, data, and/or voice services to a client device and/or a customer premise equipment device.

In embodiments, the input/output device 740 can include driver devices configured to send communications to, and receive communications from one or more networks. The input/output device 740 may function as a communication device that allows device 700 to communicate with another device over a network. Communication device 740 may include one or more wireless transceivers for performing wireless communication and/or one or more communication ports for performing wired communication.

Figure 8:
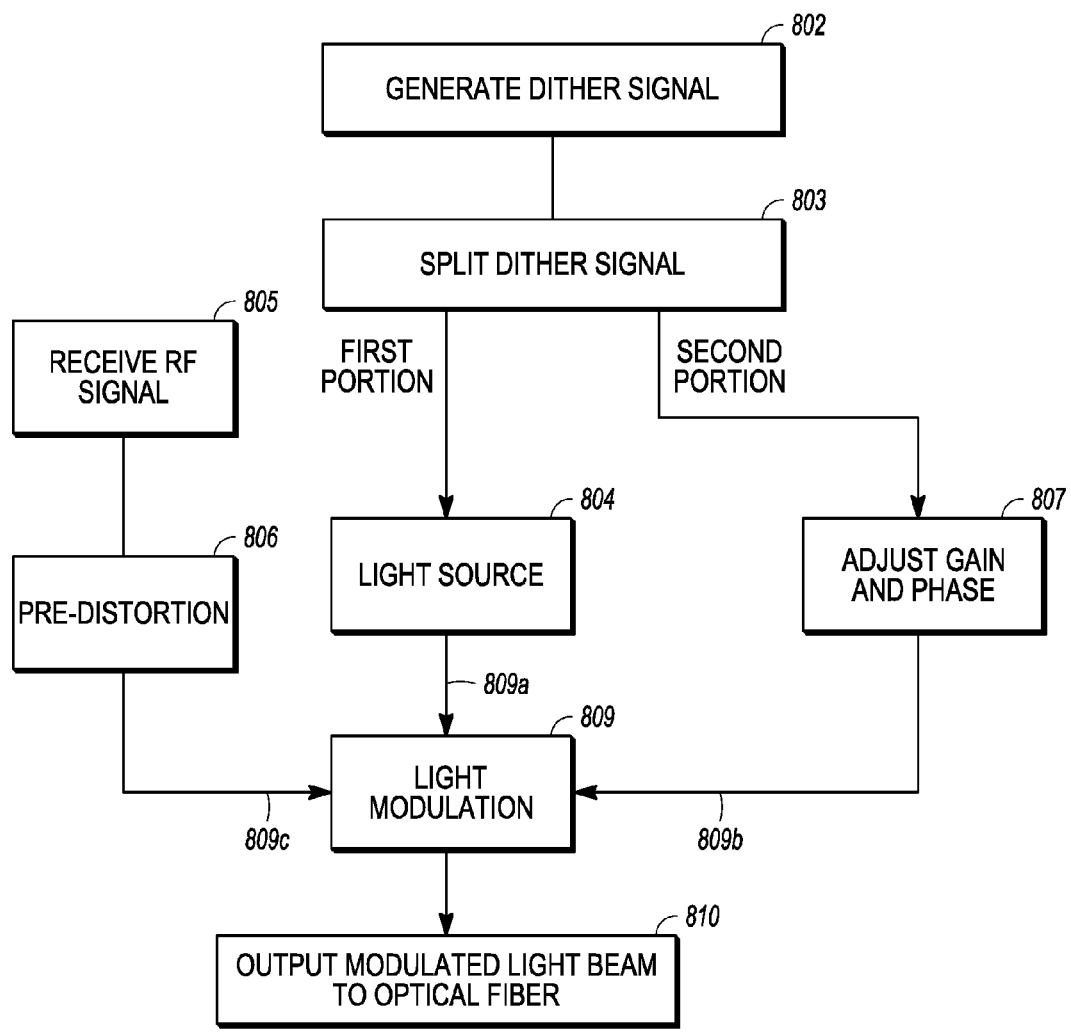
FIG. 8 depicts a flow diagram as an example of the method disclosed herein for suppressing SBS and reducing noise caused by SBS suppression techniques.

In embodiments, a computer-readable storage medium has stored thereon instructions that, when executed, cause any of the functions described herein, including the method depicted in FIG. 8. Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. For example, the signal generator, splitter, light source, phase and gain control circuit, external modulator, and the like described herein, may be capable of executing instructions or being controlled by instructions executed by a processor. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While this specification contains many specific implementation details, these should not be construed as limitations on the scope of any invention or of what may be claimed unless otherwise specified, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

FIG. 8 depicts a flow diagram as an example of the method disclosed herein for suppressing SBS and reducing noise caused by SBS suppression techniques. The method allows improved SBS suppression using the direct dithering method.

At 802, a high frequency signal may be generated for dithering, such that a resulting dither signal can be used to modulate a light source. This high frequency signal may be dithered by other lower frequency tone(s). The high frequency is referred to herein as the higher frequency relative to the frequency of the signal. In embodiments, this high frequency is at least two times the highest signal frequency.

At 803, the dither signal is split into at least two portions, a first portion of the dithered higher frequency signal for directly modulating a light source, and a second portion of the dithered higher frequency signal for adjustment by a phase and gain adjustment circuit.

The light source is both dithered at 804 and canceled at the modulation at 809. The light source 804 generates the light, the modulator at 809 adds the signal on to the light. Dithering occurs at 804, the modulation and cancellation occurs at 809.

As described in more detail herein, embodiments are disclosed in which a light beam emitted from a light source may be modulated at 809 with one or more signals. The light source may be a laser, such as a laser diode, for example. The light source may emit the light beam while the light source is directly modulated with the first portion of the dithered higher frequency signal. At 804, the first portion of the dithered higher frequency signal modulates the light source.

The second portion of the dithered higher frequency signal may be adjusted at 807 such that the gain and/or phase of the second portion of the dithered higher frequency will cancel or reduce intensity modulation at the modulator caused by the modulation of the light source by the first portion of the dithered higher frequency signal. The phase of the second portion of the dithered higher frequency signal may be adjusted to be 180 degree out of phase with the dithered higher frequency signal. The gain of the second portion of the dithered higher frequency signal may be adjusted to set a signal amplitude of the second portion to cancel the intensity modulation caused by the direct modulation of the light source by the first portion of the dithered higher frequency signal.

The light source may be modulated by the adjusted second portion of the dithered higher frequency signal at 809*b*. Thus, the light beam emitted from the light source may be externally intensity modulated by both an adjusted second portion of the dithered higher frequency signal and with a radio frequency (RF) information carrying signal.

After being emitted by the light source, which may be dithered by dithering signal(s), the light beam may be further intensity modulated externally with an RF information-carrying signal at 809*c*. The light beam which is intensity-modulated with the RF information-carrying signal at 809*c* may be thereafter coupled into optical fiber at 810.

In embodiments, the high frequency dithering signal generated at 802 is at least twice a highest frequency of the RF information-carrying signal received at 805. The pre-distortion that may occur at 806 is between the receipt of the RF signal and the modulator, where pre-distortion may generate an opposing distortion to cancel distortion generated by the modulation at 809. In embodiments, the high frequency dithering signal generated at 802 and used to modulate the light source at 809*a* spreads the optical power of the light beam in a wider optical spectral range, thereby suppressing SBS.

We claim:

1. A method for stimulated Brillouin scattering suppression in an optical transmission system, the method comprising:

receiving a radio frequency (RF) information-carrying signal;

applying one or more dithering signals to a first frequency signal having a first frequency that is at least twice the highest frequency of the radio frequency (RF) information-carrying signal to generate a dithered signal having a higher frequency than that of the RF information-carrying signal;

splitting the dithered signal, a first portion of the dithered higher frequency signal for directly modulating a light source and a second portion of the dithered higher frequency signal for adjustment by a phase and gain adjustment circuit;

emitting a light beam from the light source while directly modulating said light source with the first portion of the dithered higher frequency signal;

externally intensity modulating the light beam emitted from the light source with both an adjusted second portion of the dithered higher frequency signal and with the radio frequency (RF) information carrying signal, wherein the frequency of the adjusted second portion of the dithered higher frequency signal is at least twice the frequency of a highest RF information-carrying signal frequency; and coupling into the optical fiber the light beam modulated with the RF information-carrying signal.

2. The method of claim 1, wherein a gain or a phase of the second portion of the dithered higher frequency signal are adjusted to cancel an intensity modulation caused by modulation of the light beam by the first portion of the dithered higher frequency signal.

3. The method according to claim 2, wherein the phase of the second portion of the dithered higher frequency signal is adjusted to be 180 degree out of phase with the first portion of dithered higher frequency signal.

4. The method according to claim 2, wherein the gain of the second portion of the dithered higher frequency signal is adjusted to set a signal amplitude of the second portion to cancel the intensity modulation caused by the direct modulation of the light source by the first portion of the dithered higher frequency signal.

5. The method according to claim 1, further comprising modulating a laser bias current of the light source to cause a dithered higher frequency intensity-modulation of the light beam, wherein the light source is a laser.

6. The method according to claim 1, wherein the dithered higher frequency signal is generated by a voltage controlled oscillator (VCO), wherein dithering a higher frequency signal with a lower frequency dithering signal is accomplished by modulating a bias voltage of the VCO.

7. The method according to claim 6, wherein a wave form modulating the bias voltage has at least one of a sinusoidal waveform, a square waveform, or a triangular waveform.

8. The method according to claim 1, wherein an electronic coupler circuit splits the dithered higher frequency signal.

9. The method according to claim 1, wherein a phase of the second portion of the dithered higher frequency signal is adjusted by an electronic delay line.

10. The method according to claim 1, wherein a gain of the second portion of the dithered higher frequency signal is adjusted by at least one of an electronic attenuator or an amplifier.

11. The method according to claim 1, wherein an output signal from a phase and gain control circuit, to which the second portion of the dithered higher frequency signal is input, is applied to an external modulator to modulate the light beam.

12. The method according to claim 1, wherein an output signal from a phase and gain control circuit, to which the second portion of the dithered higher frequency signal is input, is applied to an RF pre-distortion circuit and then to an external modulator to modulate the light.

13. The method according to claim 1, wherein externally intensity modulating the light beam emitted from the light source with the adjusted second portion of the dithered higher frequency signal cancels or reduces the intensity modulation caused by modulation with the first portion of the dithered higher frequency signal.

14. The method according to claim 13, wherein reducing the intensity modulation caused by the first portion of the dithered higher frequency signal enables recovery of a symmetry of an optical spectrum of the modulated light beam.

15. The method according to claim 14, wherein recovering the symmetry of the optical spectrum reduces out of band distortion beat spectrum and dither tone distortions.

16. The method according to claim 13, further comprising simultaneously canceling or reducing noise due to a beat between an SBS suppression dither tone and out of band distortion beat spectrum.

17. The method according to claim 13, wherein both the RF information carrying signal and the adjusted second portion of the dithered higher frequency signal are provided to a pre-distortion circuit before used to modulate the light beam.

18. A method of reducing noise caused by a beat between a stimulated Brillouin scattering (SBS) suppression tone and a radio frequency (RF) information signal distortion out of band spectrum, while transmitting an optical signal through optical fiber, the method comprising:

receiving a radio frequency (RF) information-carrying signal;

applying one or more dithering signals to a first frequency signal having a first frequency signal that is higher than that of the RF information-carrying signal, thereby generating a dithered higher frequency signal which is a SBS suppression higher frequency dither signal;

splitting the higher frequency dither signal, a first portion of the dithered higher frequency signal for directly modulating a light source and a second portion of the dithered higher frequency signal for adjustment by a phase and gain adjustment circuit;

adjusting a gain and phase of the second portion of the dithered higher frequency signal by adjusting the gain to modify a signal amplitude and adjusting the phase to be out of phase with the dithered higher frequency signal of the first portion of the dithered signal modulating the light beam for cancelling noise caused by the beat between the SBS suppression tone and RF information signal distortion out of band spectrum, by externally intensity modulating the light beam emitted from the light source with both the adjusted second portion of the dithered higher frequency signal and with a radio frequency (RF) information carrying signal; and coupling into the optical fiber the light beam modulated with the RF information-carrying signal.

19. The method of claim 18, wherein the beat causing noise is an out of band beat in a frequency band outside the highest frequency of the RF information frequency signal band.

20. The method according to claim 18, wherein the phase of the second portion of the dithered higher frequency signal is adjusted to be 180 degree out of phase with the first portion of the dithered higher frequency signal.

21. The method according to claim 18, further comprising modulating a laser bias current of the light source to cause a higher frequency intensity-modulation and optical frequency modulation of the light beam, wherein the light source is a laser.

22. A method according to claim 18, wherein the dithered higher frequency signal is generated by a voltage controlled oscillator (VCO), wherein dithering a higher frequency signal with a lower frequency dithering signal is accomplished by modulating a bias voltage of the VCO.

23. An optical transmitter for stimulated Brillouin scattering suppression in an optical transmission system, the method comprising:
   a signal generator for generating a dithered higher frequency signal by applying one or more dithering signals to a generated signal;
   a splitter for splitting the dither signal, a first portion of the dithered higher frequency signal for directly modulating a light source and a second portion of the dithered higher frequency signal for adjustment by a phase and gain adjustment circuit;
   a light source for emitting a light beam while said light source is directly modulated via the first portion of the dithered higher frequency signal;
   the phase and gain control circuit for adjusting at least one of a gain or a phase of the second portion of the dithered higher frequency signal;
   an external modulator for externally intensity modulating the light beam emitted from the light source with both the adjusted second portion of the dithered higher frequency signal and with a radio frequency (RF) information carrying signal,
   wherein the frequency of the direct modulating signal for SBS suppression is at least twice the frequency of the highest RF information-carrying signal frequency; and
   a coupler for coupling into the optical fiber the light beam modulated with the RF information-carrying signal.

24. The optical transmitter according to claim 23, further comprising an electronic delay line for adjusting the phase of the second portion of the dithering higher frequency signal.

25. The optical transmitter according to claim 23, further comprising an electronic attenuator or amplifier for adjusting the gain of the second portion of the dithering higher frequency signal.

26. The optical transmitter according to claim 23, wherein the phase and gain control circuit adjusts the at least one of the gain or the phase of the second portion of the dithered higher frequency signal until the output of the phase and gain control circuit cancels or reduces an intensity modulation caused by the modulation of the light beam by the first portion of the dithered higher frequency signal.

27. The optical transmitter according to claim 23, further comprising a RF pre-distortion circuit, wherein an output signal from a phase and gain control circuit, to which the second portion of the dithered higher frequency signal is input, is applied to an RF pre-distortion circuit and then to an external modulator to modulate the light.

* * * * *